United States Patent [19]
Bell et al.

[11] 3,931,520
[45] Jan. 6, 1976

[54] SAMPLE POSITIONING APPARATUS

[75] Inventors: Thomas H. Bell, Boulder; Charles H. Johnson, Jr., Arvada; Robert L. Lane, Golden; Bradley E. Martin, Arvada; William H. Tyree, Boulder, all of Colo.

[73] Assignee: The United States of America as represented by the United States Energy Research and Development Administration, Washington, D.C.

[22] Filed: Nov. 8, 1974

[21] Appl. No.: 522,176

[52] U.S. Cl............................. 250/328; 193/35 SS
[51] Int. Cl.².......................................... G01T 1/00
[58] Field of Search.......... 250/328, 337; 193/35 SS

[56] References Cited
UNITED STATES PATENTS

| | | | |
|---|---|---|---|
| 3,270,202 | 8/1966 | Long et al. | 250/328 |
| 3,487,219 | 12/1969 | Smith et al. | 250/328 |
| 3,725,659 | 4/1973 | Culley | 250/337 |

*Primary Examiner*—Davis L. Willis
*Attorney, Agent, or Firm*—Dean E. Carlson; Dudley W. King; Ignacio Resendez

[57] ABSTRACT

Apparatus for use in alpha particle counting with such as photomultiplier tubes, comprising a platform and linkage mechanism whereby samples are moved in linear manner toward and away from ends of the photomultiplier tubes.

8 Claims, 3 Drawing Figures

SAMPLE POSITIONING APPARATUS

BACKGROUND OF INVENTION

The invention relates to a sample carrier apparatus for use in alpha particle counting.

A problem associated with a prior art sample holders for presenting samples to the sensitive alpha particle detecting phosphor on the photocathode end of photomultiplier tubes is the background detected by the radiation detecting phosphor deriving from adjacent metal surfaces. Other disadvantages include the mode of presenting the sample of the end of the photomultiplier tube such that the tubes and housing were easily contaminated requiring subsequent disassembly and decontamination of a relatively complex apparatus or device. Constant disassembly aggravated the problem of retaining a seal against light leakage into the container. Additionally, some prior art apparatuses required that the samples be positioned on the holder in almost the exact location in which they would be tested since the apparatus design allowed for only very little vertical movement of the samples. The further presented contamination problems.

The net result of these disadvantages in that error was introduced into analysis creating incorrect results, and further, compensatory measures could be required to compensate for the background and geometry readings.

SUMMARY OF INVENTION

In view of the foregoing disadvantages, it is an object of this invention to reduce the background detected by radiation detecting devices, such as photomultiplier tubes and solid state detectors.

It is a further object of this invention to provide a novel apparatus which reduces the background for which compensatory measures would ordinarily be required.

It is a further object of this invention to provide a sample lifting apparatus having relatively flat, parallel lift configuration and vertical movement of the samples permitting accurate and repeatable placement of a plurality of samples for analysis by a corresponding number of photomultiplier tube or other detecting units.

Various other objects and advantages will become apparent from the following description of this invention and the most novel features will be particularly pointed out hereinafter in connection with the appended claims. It will be understood that various changes in the details, materials and steps of the process, which are herein described and illustrated in order to explain the nature of the invention, may be effected by those skilled in the art without departing from the scope of this invention.

The invention comprises apparatus for use in association with alpha particle counting using appropriate detecting devices such as photomultiplier tubes, which apparatus has a planar base, a planar sample carrier or platform, and swivel or rotatable means for converting reciprocable movement of base to lateral movement of said platform relative to the base thereby positioning samples in alignment with and a spaced distance from a detecting device such as the photocathode end of the photomultiplier tube.

DETAILED DESCRIPTION

Figure 1:
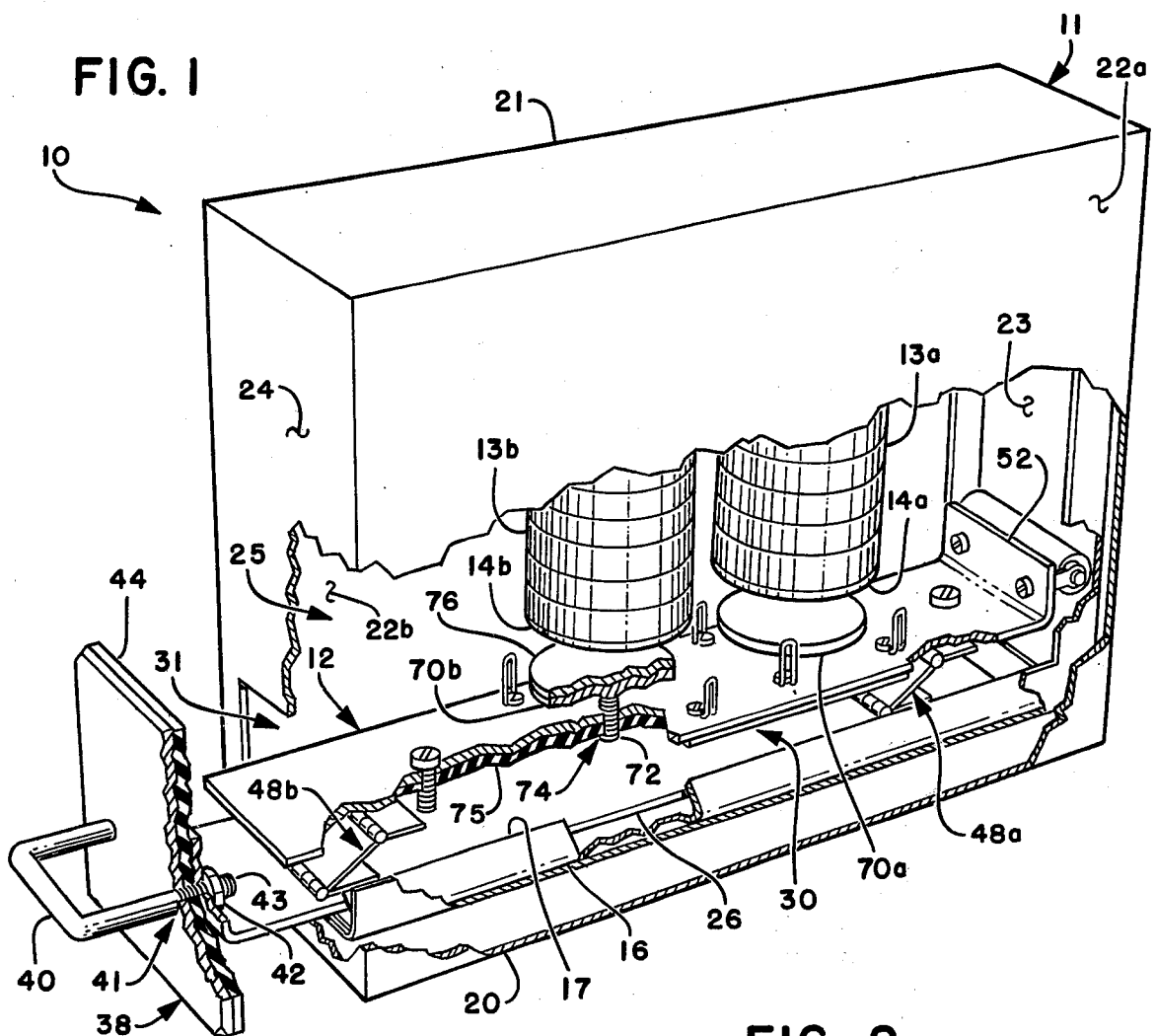
FIG. 1 illustrates a partially cross-sectional, cut-away perspective view of an embodiment of this invention.

As shown in FIG. 1, a radiation sampling apparatus or module 10 has contained therein a sample carrying table or platform 12 which is adapted to be raised and lowered for radiation analysis of the samples by an alpha counter system which may include detecting devices such as photomultiplier tubes or detectors 13a, 13b. Module 10 may include suitable enclosure or housing 11 comprising bottom wall 20, top wall 21, sides walls 22a, 22b, rear wall 23 and front wall 24, for providing a light protected and radiation shielded environment in chamber 25 for radiation detection analysis.

Platform 12 is movably fastened to and carried by a planar base member 26 which slides into and out of chamber 25 in a reciprocating or drawer fashion while resting on or being supported between guides 16 on each side of planar base member 26, which guides are rigidly attached to housing 11 by suitable means such as weld joints or the like (not shown). Guides 16 may have slanted or inwardly projecting flanges 17 again on each side of planar base member 26, which flanges cooperate to form a reduced or restricted passageway such that the base 26 and platform 12 may not be inadvertently tilted to damage or contaminate photocathode ends 14a, 14b of the photomultiplier tubes or detectors 13a, 13b respectively.

Platform 12, base 26, and the hinge means or rotatable link member discussed hereinbelow for converting or translating the linear sliding motion of base 26 to a lateral up-down motion of platform 12 relative to base member 26, combine to form lift apparatus or mechanism 30. Housing 11 front wall 24 has an opening or aperture 31 for insertion of lift mechanism 30 into housing 11 and chamber 25, and removal therefrom. The planar base 26 of lift mechanism 30 aligns lift mechanism 30 into housing 11 chamber or enclosure 25 by means of guides. Base 26 may have, at one end thereof, a wall 36 which is appropriately connected or attached to base 26 with a plane at about 90° to the plane of base 26. If desired, wall 36 may be a part of base 26 such as by forming a bend 32 which forms wall 36 for engagement to the opening cover 38. Cover 38 may be rigidly attached to wall 36 through any suitable means, including retaining handle 40 in position through apertures 41 in cover 38 with wall 36 by suitable means such as nuts 42 on threaded end portions 43 of handle 40.

Material, such as rubber, for sealing light passage from chamber 25 may be disposed as a gasket or seal 44 between cover 38 and front wall 24. Seal 44 may be maintained in alignment with cover 38 using a retaining handle 40 as described above by supporting seal 44 intermediate cover 38 and wall 36. It should be obvious that various other methods may be used to attach a cover to base 26 and also to provide a light seal, such as by attaching an adhesive gasket to either the front wall 24 or cover 38 to effectively seal light passage from chamber 25 upon closure of cover 38.

Base 26 supports or carries a planar sample carrier or platform 12 by suitable rotatable link members or swivel means such as double swivel hinges or pivotal link members 48a, 48b. Each hinge or link member 48a, 48b may have a pair of end members (49a, 49b), (49c, 49d) respectively pivotally joined by an intermediate connecting member 51a, 51b respectively with pivot pins (50a, 50b), (50c, 50d) respectively. Intermediate interconnecting members 51a, 51b are of a length which permits, in the "down" mode of the platform, passage under the photomultiplier tubes and in the "up" mode, placement of the carried samples at about 0.25 inches from the ends of the photomultiplier tubes. A preferred length of these members is from about 0.50 to about 0.75 inches. Hinges 48a, 48b may be rigidly attached to mechanism 30, such as by welding one end 49a, 49c to base 26 and an opposite end thereof, 49 b, 49d, to platform 12. The rotatable link members interconnect base 26 and platform 12 for translating the platform laterally with respect to the base member concomitant with reciprocal movement of the base.

Planar sample carrier or platform 12 may have an end wall 52 rigidly attached at an angle of about 90° with respect to platform 12 such as by welding or other connecting means at one end thereof. As shown in the drawing, a possible alternative is for platform 12 to have a bend 54 to form the upright portion or wall 52 having a plane which meets the plane of platform 12 at suitable angle, such as an angle of about 90°. A roller 60 made of a material such an nylon or the like is supported in a rotatable position by means of fingers or supports 56 which engage pins or shaft 62 extending from the end walls of roller 60. Fingers or supports 56 are suitably attached to wall 52 by such means as mounting screws 58 or the like. Also mounted on platform 12 in tapped bores may be screws 66a, 66b, as shown in FIG. 1, which may be selectively settable to maintain a predetermined distance between platform 12 and base 26 to insure a proper lifting movement or action being produced from interaction of mechanism 30 and wall 23. As shown, screws 66a, 66b are resting on base 26 preventing further downward movement of platform 12 by means of hinges or pivot members 48a, 48b.

Figure 2:
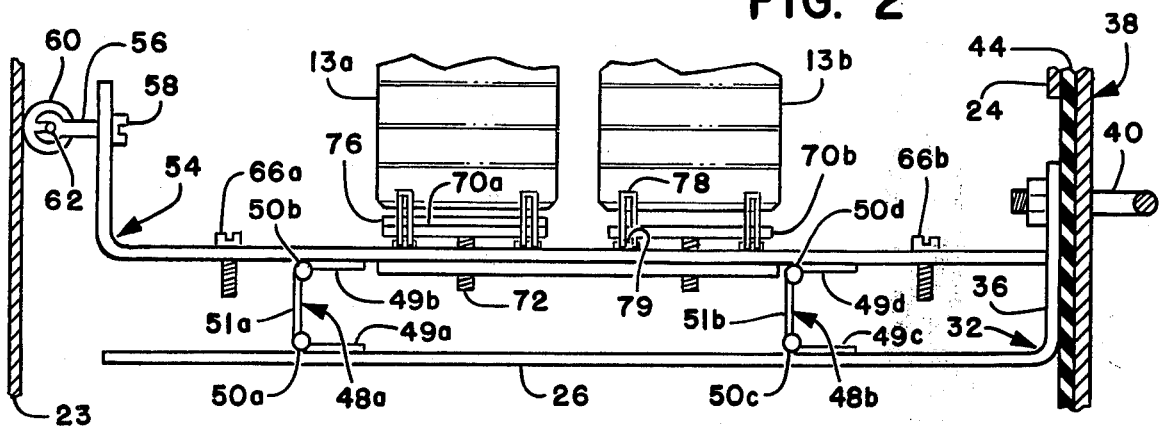
FIG. 2 is a partially cross-sectional cut-away view of a portion of an embodiment of this invention after activation of the swivel means to a sample analysis position.

A stop and guide member is placed in the path of movement of a portion of platform 12 for terminating the inward portion of the reciprocal motion of the platform and translating the continued inward motion of base 26 into substantially straight vertical movement of the platform 12 and samples carried by the platform toward the photomultiplier tube ends, and then away from the photomultiplier tube ends in the outward portion of the reciprocal motion of base 26. As shown in FIGS. 1 and 2, this stop and guide member may be rear wall 23.

Mounted on platform 12 may be one or more sample holders 70a, 70b. Threaded stems 72 are rigidly engaged with sample holders 70a, 70b and are disposed in tapped bores 74 through platform 12 and locking plate 75. Threaded engagement of stem 72 with platform 12 and locking plate 75 allows for vertical adjustment of sample holders 70a, 70b and thereby compensate for different thicknesses of sample 76. Plate 75 may be used to provide greater surface contact to stems 72 to aid or further protect against rotation movement, wobble, or the like of sample holders 70a, 70b. Plate 75 may be appropriately attached to platform 12 such as by an adhesive or other means such as screws 79, and further may be made of any suitable material such as polyethylene, polypropylene or the like. The thickness of plate 75 may vary but may be between about ⅛ and ¼ inch thick.

A plurality of retainers or guides 78 laterally extending from platform 12 may be disposed at the periphery of each sample holder 70a, 70b. These retainers 78 may be metal tabs or the like rigidly engaged with platform 12 by suitable means such as screws 79, or the retainers may themselves be appropriate screws disposed in tapped bores on platform 12. Retainers 78 perform the function of aligning the samples with the photomultiplier tubes, and further, prevent sample 76 which may be disposed on the sample holders from moving out of alignment of appropriate holders and photomultiplier tubes. As shown in the art, appropriate coaxial connectors (not shown) or the like may be used to provide a means for passing an electrical current or other signal through a wall of the housing to the detection device used.

FIG. 1 generally illustrates the lift mechanism 30 in an inactivated position. As shown, cover 38 and gasket 44 have not made contact with front panel 24, and hinges 48a, 48b are in a down mode. Roller 60 has contacted rear wall 23 such that further inward sliding motion which may be transmitted to base 26 results in an upward vertical movement of platform 12.

FIG. 2 illustrates the activated mode of the lift mechanism or apparatus 30 wherein a light seal has been effected by means of gasket 44 around the periphery of opening 30 in front panel 24. Further, the force exerted upon cover 38 to effect the seal resulted in inward movement of base 26 and pivoting of hinges 48a, 48b around hinge pins 50a, 50b, 50c, 50d in relation to base 26 so as to effect an upward, vertical movement of sample 76 and sample holders 70a, 70b to a closer proximity to ends of photomultiplier tubes 13a, 13b. Roller 60, which is in abutment with rear wall 23 permits the upward vertical movement of platform 12 by rolling along wall 23 as base 26 is inserted into chamber 25. The height to which the samples are raised by the vertical movement of platform 12 to photomultiplier tubes 13a, 13b may be controlled or selectively established by adjusting the height of sample holders 70a, 70b. As shown in the drawing, the lift mechanism 30 may be designed such that the desired height of sample 76 is achieved when cover 38 makes contact with front wall 24 through gasket 44 by having platform 12 in abutment with cover 38 or wall 36 as shown in FIG. 2. It will be obvious that various other means, such as stop pins, may be used to locate the platform 12 in a desired spatial relationship with the photomultipliers 13a, 13b or other detecting devices whereby the sample holders are positioned in such relationship to the photomultiplier tubes as to provide most efficient and accurate alpha particle detection. As shown in the drawings, the samples are in coaxial alignment with the photocathode ends of the photomultiplier tubes. It is also obvious that appropriate locking or latching means may be employed to retain cover 38 against front wall 24 and thus prevent light passage therethrough and that, although alpha particle detection is discussed, this invention is suitable to other radiation or the like detection or analysis systems.

Figure 3:
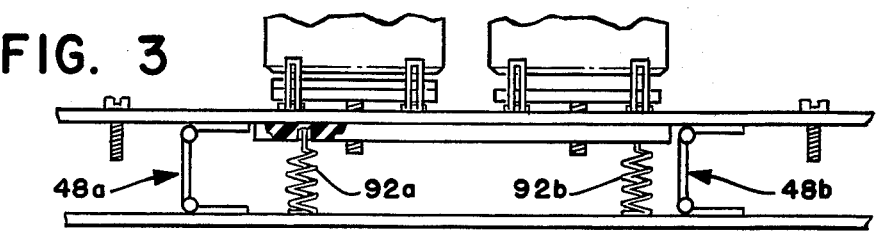
FIG. 3 illustrates a cut-away view of another embodiment of the sample carrying table.

FIG. 3 illustrates the use of restraining or biasing means, as shown by springs 92a, 92b, which assist in retracting or urging platform 12 to the down position by providing a downward bias. The use of these springs or restraining members also extends the application of this invention to geometries other than those wherein the axis of the photomultiplier tubes is vertical i.e., the axis of the photomultiplier tubes could be horizontal and this invention, could still be used by including springs 92a, 92b to urge platform 12 down to the base 26. The springs in this case act as a gravity substitute.

This invention permits the use of several detecting devices such as photomultiplier tubes in a module for analyzing several samples since it translates planar reciprocating motion to uniform lateral motion that is perpendicular to the plane of the reciprocating motion. This invention further results in a reduction of background in analyzing samples since the invention permits the samples to be brought simultaneously and uniformly into close proximity of the cathode detector end of the photomultiplier tube. The movement of the platform lateral to the reciprocal movement of the base member which results in the generally vertical raising and lowering of the samples to and from the detector device used, eliminates or extensively reduces the contamination problems previously encountered and concurrently provides accurate and repeatable geometrical alignment of each sample station with the respective detection devices being used.

What is claimed is:

1. Apparatus for use in alpha-particle counting by moving samples toward and away from the ends of photomultiplier tubes comprising a reciprocally movable base member, a platform adjacent said base member, sample holder means carried by said platform for retaining and positioning samples to be counted; a rotatable link member interconnecting said base member and said platform for reciprocal movement of said platform with said base member and for translating said platform and sample holder means generally perpendicularly with respect to said base member concomitant with reciprocal movement of said base member to present samples into close proximity to said ends of the photomultiplier tubes and remove them therefrom, guide means for positioning and guiding said base member during reciprocal movement thereof, and a stop and guide member in the path of movement of a portion of said platform for terminating the reciprocal movement of said platform and effecting substantially straight movement of said platform and sample holders toward and away from said photomultiplier tube ends.

2. The apparatus of claim 1 wherein said sample holder means comprises a sample holder, a threaded shaft rigidly engaged to said sample holder, said threaded shaft supported within a tapped bore on said platform to selectively set the height of said sample holder from said platform; guide means projecting from said platform adjacent the periphery of said sample holder for guiding said holder and positioning said holder in coaxial alignment with one of said photomultiplier tube ends.

3. The apparatus of claim 1 wherein said rotatable link member comprises a pair of spaced apart links, each of said links being from about 0.50 to about 0.75 inches long, and a swivelable pin interconnecting said platform and said link at one end of each of said links and another swivelable pin interconnecting said base member and said link at an opposite end of each of said links.

4. The apparatus of claim 1 together with selectively adjustable means for positioning said platform in spaced relation from said base.

5. The apparatus of claim 1 wherein said photomultiplier tubes are housed in a walled enclosure including back and front walls, said front wall has an opening for said apparatus, said reciprocal motion of said base member is into and out of said opening in said front wall, said stop and guide member in the path of movement of a portion of said platform comprises said back wall of said enclosure, roller is rotatably mounted on said platform for coacting with said back wall to translate linear reciprocal motion of said base member to generally perpendicular reciprocal motion of said platform.

6. The apparatus of claim 5 wherein said enclosure houses a plurality of photomultiplier tubes disposed along the reciprocating movement path of said base and said platform.

7. The apparatus of claim 1 together with a locking plate at a thickness of from about one eighth to about one fourth inch selected from the group consisting of polyethylene and polypropylene disposed on the underside of said platform intermediate said rotatable link members.

8. The apparatus of claim 7 together with retaining means interconnecting said platform and said base member biasing said platform toward said base member.

* * * * *